US010523782B2

(12) United States Patent
Namboodiri et al.

(10) Patent No.: US 10,523,782 B2
(45) Date of Patent: Dec. 31, 2019

(54) APPLICATION DELIVERY CONTROLLER

(71) Applicants: Vipin Namboodiri, Karnataka (IN); Krishna Prasad Agara Venkatesha Rao, Karnataka (IN)

(72) Inventors: Vipin Namboodiri, Karnataka (IN); Krishna Prasad Agara Venkatesha Rao, Karnataka (IN)

(73) Assignee: Ricoh Co., Ltd., Tokyo (JP)

( * ) Notice: Subject to any disclaimer, the term of this patent is extended or adjusted under 35 U.S.C. 154(b) by 319 days.

(21) Appl. No.: 15/452,538

(22) Filed: Mar. 7, 2017

(65) Prior Publication Data

US 2018/0262496 A1 Sep. 13, 2018

(51) Int. Cl.

| | |
|---|---|
| ***H04L 29/06*** | (2006.01) |
| ***H04L 29/08*** | (2006.01) |
| ***H04L 9/32*** | (2006.01) |

(52) U.S. Cl.

CPC .......... *H04L 67/327* (2013.01); *H04L 9/3247* (2013.01); *H04L 63/0807* (2013.01); *H04L 63/18* (2013.01)

(58) Field of Classification Search

CPC ............. H04L 63/0209; H04L 63/0227; H04L 63/0236; H04L 63/0807; H04L 63/0815; H04L 63/105; H04L 63/327; H04L 9/3247; G16H 10/60; G16H 80/00; G06Q 50/24

See application file for complete search history.

(56) References Cited

U.S. PATENT DOCUMENTS

| | | | | |
|---|---|---|---|---|
| 7,380,273 | B2 * | 5/2008 | Coley .................. | G06Q 20/027 705/79 |
| 7,590,550 | B2 | 9/2009 | Schoenberg | |
| 7,835,926 | B1 * | 11/2010 | Naidoo ................ | A61B 5/0002 705/3 |
| 2007/0101418 | A1 * | 5/2007 | Wood ...................... | G06F 21/31 726/8 |
| 2017/0116384 | A1 * | 4/2017 | Ghani ..................... | H04L 63/08 |

* cited by examiner

*Primary Examiner* — Minh Dinh

(74) *Attorney, Agent, or Firm* — Patent Law Works LLP

(57) ABSTRACT

An application delivery controller for improving remote healthcare services is disclosed. The application delivery controller may be configured to provide improved service routing and security. In some implementations, the application delivery controller may receive a service request from a client device. The application delivery controller may determine routing parameters based on a requested service of the service request, authenticate access from the client device based on the requested service, a security zone of the requested service, and a token, and route the requested service to the client device based on the routing parameters and the authenticated access.

20 Claims, 10 Drawing Sheets

300a

| 302 | 304 | 306 | 308 | 310 | 312 | 314 | 316 | 318 | 320 |
|---|---|---|---|---|---|---|---|---|---|
| 1 | 2 | 3 | 4 | 5 | 6 | 7 | 8 | 9 | 10 |
| SERVICE | DSTIP | DSTPORT | PROTOCOL | STRP | TYPE | SRVCDEFINITION | TOKENNEEDED | WLROLES | SECI RITY ZONE |
| Stream3 | 10.7.4.1 | 7070 | http | 1 | normal | strsrvr | 1 | Doctor | 1 |
| eqs1 | 10.7.4.1 | 8080 | http | 1 | normal | queuingservice | 1 | Doctor, Nurse, transcr iber | 1 |

| 352 | 354 | 356 | 358 | 360 | 362 | 364 |
|---|---|---|---|---|---|---|
| 1 | 2 | 3 | 4 | 5 | 6 | 7 |
| SERVICENAME | METHOD | API | TYPE | TOKENNEEDED | WLROLES | SECIRITYZONE |
| strsrvr | GET | livestream | getstream | 1 | Admin, Technologist | 2 |
| strsrvr | POST | livestream | poststream | 1 | Admin | 3 |
| queuingservice | GET | streamactiv eecgdir | event | 1 | Doctor, Nurse,transcriber | 2 |
| queuingservice | GET | hosp/employ eedetails | normal | 1 | Doctor | 3 |

| 1 | 2 | 3 | 4 | 5 | 6 | 7 | 8 | 9 | 10 |
|---|---|---|---|---|---|---|---|---|---|
| SERVICE | DSTIP | DSTPORT | PROTOCOL | STRP | TYPE | SRVCDEFINITION | TOKENNEEDED | WLROLES | SECURITYZONE |
| eqs1 | 10.7.4.1 | 8080 | http | 1 | normal | queuingservice | 1 | Doctor, Nurse, Transcriber | 1 |
| Emergencyeqs1 | 10.7.4.1 | 8080 | http | 1 | normal | queuingservice | 0 | dontcare | 1 |

| BASE 64 ENCODED USER CREDENTIALS | BASE 64 ENCODED (SHA1((SIGNATURE))) |
|---|---|
| dXNlcj1kci5kZXZyYWp1cnNAcmlwbC5yaWNvaC5jb207cm9sZT1kb2N0b3I7ZXhwaXJlcz0yMSBGZWIgMjAxNiAxNzowMDowMCBHTVQ7aW5kaWNlcz18bfznGwIMRTt | zaWduYXR1cmU92Bqz/m3DcZRr8mzFSY4vcXLkVJE7 |

APPLICATION DELIVERY CONTROLLER

BACKGROUND

The present disclosure relates to the field of application delivery controllers. In particular, the present disclosure relates to an application delivery controller for improving remote healthcare services.

In many parts of the world, the provision of adequate healthcare has been complicated due to the lack of sufficient number of doctors located in proximity to the patients. Advanced digital/mobile technology providing low cost connectivity and compute power has enabled the option of large scale telemedicine and advanced cloud-based systems are being deployed. These systems enable a variety of care to be delivered to patients conveniently and cost-effectively using local systems and attendants and remote doctors using video conferencing.

Further, telemedicine presents numerous security and efficiency problems, due to the confidential nature of information, that are not sufficiently addressed by existing systems. Existing servers that support routing are expensive and have limited feature sets that do not satisfy the needs of a system in which many services are available.

SUMMARY

Systems and methods for an improved application delivery controller are disclosed. In one embodiment, the application delivery controller may be used in a telemedicine system. For example, the application delivery controller provides a boundary between a client and services system and may receive a service request from a client device and determine routing parameters based on a requested service of the service request. The application delivery controller may authenticate access by the client device based on the requested service, a security zone of the requested service, and a token. The application delivery controller may then route the requested service to the client device based on the routing parameters and the authenticated access.

Other implementations of one or more of these aspects include corresponding systems, apparatus, methods, and computer programs, configured to perform the actions of the methods, encoded on computer storage devices. It should be understood that the above is not all-inclusive and many additional steps, features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The implementations are illustrated by way of example, and not by way of limitation in the figures of the accompanying drawings in which like reference numerals are used to refer to similar elements.

FIG. 3A illustrates an example routing table for providing services via the application delivery controller according to some implementations of the techniques described herein.

FIG. 3B illustrates an example service table for providing services via the application delivery controller according to some implementations of the techniques described herein.

FIG. 9 illustrates an example routing table for providing emergency services via the application delivery controller according to some implementations of the techniques described herein.

FIG. 10 illustrates a table with example encoded user credentials and signature according to some implementations of the techniques described herein.

DETAILED DESCRIPTION

Figure 1:
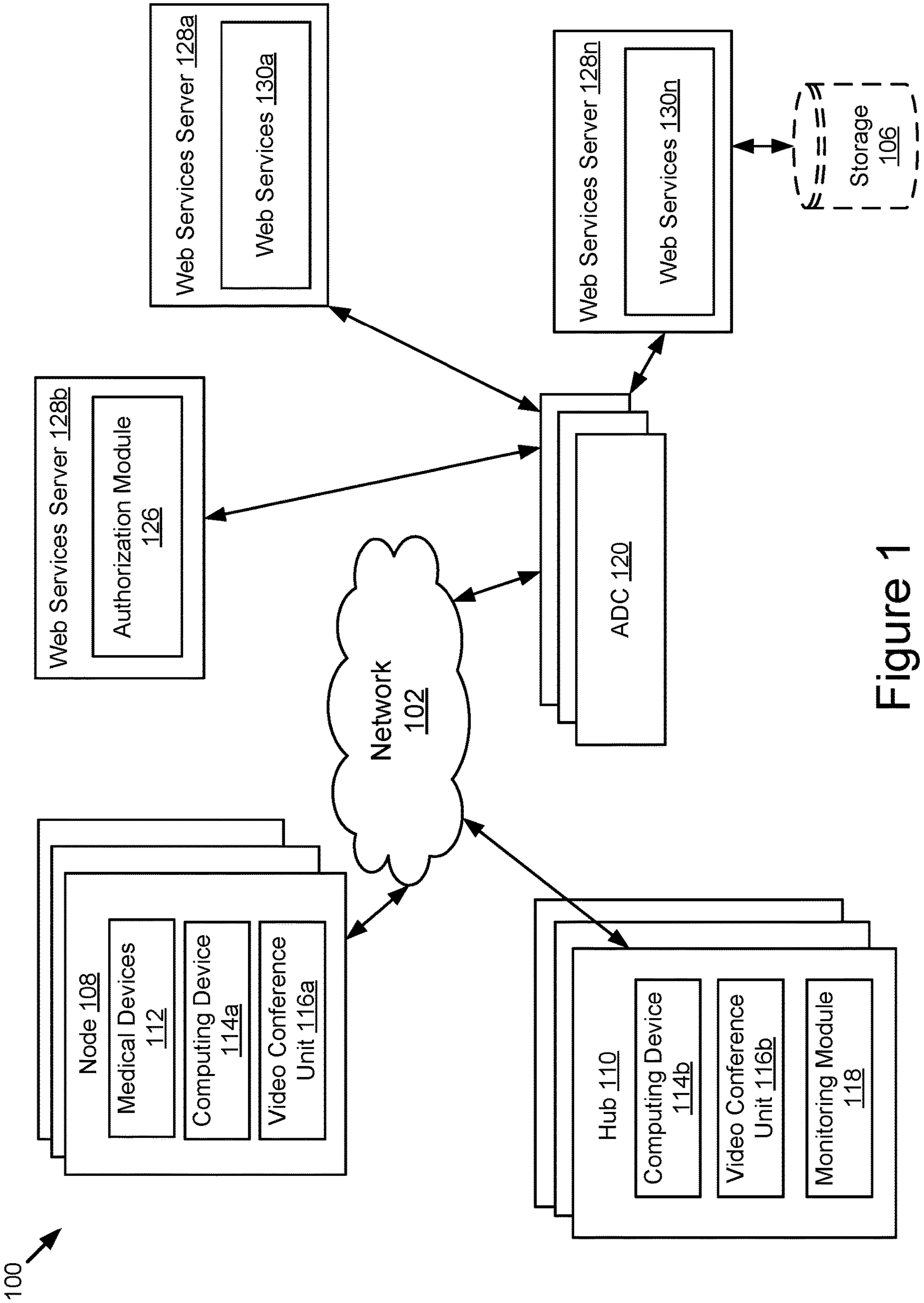
FIG. 1 illustrates a block diagram of an example advanced telemedicine system according to some implementations of the techniques described herein.

A system and method for securely routing services are described. In the following description, for purposes of explanation, numerous specific details are set forth in order to provide a thorough understanding of the implementations. It will be apparent, however, to one skilled in the art, that the implementations can be practiced without these specific details. In other instances, structures and devices are shown in block diagram form in order to avoid obscuring the implementations.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

The present implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories or any type of media suitable for storing electronic instructions.

The implementations can take the form of an entirely hardware implementation, an entirely software implementation or an implementation containing both hardware and software elements. An example implementation is implemented in software, which includes but is not limited to firmware, resident software, microcode, etc.

Furthermore, the implementations can take the form of a computer program product accessible from a non-transitory computer-usable or computer-readable medium providing program code for use by or in connection with a computer or any instruction execution system. For the purposes of this description, a computer-usable or computer readable medium can be any apparatus that can contain, store, or transport the program for use by or in connection with the instruction execution system, apparatus, or device.

The techniques and systems disclosed herein overcome the deficiencies of the prior art by providing an improved application delivery controller with a unique feature set. The application delivery controller, among other things, provides an interface between services (e.g., the web services 130 described in reference to FIG. 1) and outside client computing devices (e.g., a node 108, a hub 110, etc., described in reference to FIG. 1), for example, via a network (e.g., the network 102 described in reference to FIG. 1). In some implementations, the improved application delivery controller is configured to provide access at the level of a method or application programming interface (API) using a role of the user, a zone of security, uniform resource locator (URL) based routing, and/or support for redundancy. In some implementations, the improved application delivery controller may also or alternatively be configured to provide an HTTP to HTTPS protocol bridge, an HTTPS to HTTP protocol bridge, emergency services, validation and assignment of tokens, and/or other security services. These and other implementations and features are described in further detail throughout this disclosure.

The improved application delivery controller (referred to hereinafter simply as the application delivery controller), according to the techniques described herein, provides a service routing framework that may provide access to privileged services to an external computing device via a single interface. By using the application delivery controller to route incoming packets to appropriate services, deep packet inspection can occur before the packets are routed. For example, because APIs may be segregated across a variety of services, the application delivery controller may provide a service routing framework which may examine the URL of a service request, forward the service to the appropriate service, and, in some instances, inspect the packet before routing the service with those APIs. The deep packet analysis may provide additional security (e.g., de-hashing a token and/or signature, providing multiple tiers of layered security, etc.), authenticate a user or client device (e.g., based on the role of the user and/or token) enable requested services to be checked and balanced, provide a single interface for routing requests, etc.

In some implementations, authenticating a user according to the techniques described herein allows the application delivery controller to provide specific levels of access to specific services based on the role of that user. For example, as described, access to specific services and/or directories on a file system can be provided using a white list directory (e.g., only those roles/users listed are allowed access to services). Accordingly, authorization primitives may be built around a user or role.

The techniques and systems disclosed herein may further provide a telemedicine system with intelligent triage that replaces a remote doctor with a virtual doctor in cases where the circumstances are conducive to satisfactory handling by an artificial intelligence system (e.g., an expert system or knowledge-based system). The telemedicine system may include a triage procedure at the tele-clinic that employs a local attendant and software to determine if the patient needs to be seen by a human doctor or can be satisfactorily served by the virtual doctor AI system. The telemedicine system may further include an AI system (e.g., an expert or knowledge-based system) comprising a knowledge-base, an inference engine, input module, output module, central/monitoring module, and learning module. In some implementations, the telemedicine system includes a remote control or operations center where the operation of the virtual doctors can be monitored by a set of human doctors who can choose to intervene if/when necessary. The control or operations centers could be large control/operation centers or distributed centers with individual doctors operating in their own locations with a set of consultations being shown/shared with them on an individual dashboard.

The same principles of leverage using triage with AI could be applied to other types of medical professionals like nurse practitioners/physicians' assistants (e.g., expanding virtual doctor to virtual healthcare professional and various specialty care options that have well-defined workflows). Some advantages of the telemedicine system are significantly higher availability of care at significantly lower cost. Additional advantages over existing telemedicine systems include an increased number of patients that may be seen, particularly for minor healthcare issues, since a large portion of routine cases can be handled by a virtual doctor. Further, a small team of physicians may monitor a relatively large number of virtual doctor sessions to intervene if an exception is noted (either by the virtual doctor or a monitoring physician). Thus, applying the techniques and systems described herein, more patients can be seen with fewer resources than in existing telehealth systems, in part because service routing, packet handling, and security management can be performed more quickly and efficiently than in existing systems.

FIG. 1 illustrates a block diagram of an example advanced telemedicine system 100 according to one implementation of the techniques described herein. The illustrated system 100 includes one or more nodes 108, one or more hubs 110, one or more application delivery controllers (ADC) 120, and a plurality of web services servers 128. In the illustrated implementation, these entities are communicatively coupled via a network 102. While the system 100 is described herein with respect to a telemedicine system, it should be understood that the system may be deployed in other verticals.

It should be noted that, although not explicitly shown in FIG. 1, in some implementations, a client device may include a computing device 114 at a node 108 or a hub 110, but it should be noted that a client device may include any user accessible computing device such as a personal computer, laptop, desktop, smartphone, tablet, etc.

While FIG. 1 illustrates three nodes 108 and three hubs 110, the techniques introduced herein may be implemented on any system architecture having any number of nodes 108 or hubs 110. Additionally, while the example of FIG. 1 illustrates only one network 102 coupling the nodes 108, the hubs 110, and the application delivery controller 120, in practice any number of networks 102 can be used to connect the entities.

In one implementation, the web services server **128*b* comprises an authorization module 126 and is connected to the network 102 via the application delivery controller 120. The authorization module 126 is code and/or routines for registering a user and/or generating a token for a user. In one implementation, the authorization module 126 is a set of instructions executable by a processor. In another implementation, the authorization module 126** is stored in memory and is accessible and executable by the processor.

The authorization module 126 may serve as a gatekeeper for managing user access to the web services server 128 and web services 130. In some implementations, the authorization module 126 exchanges random, secret numbers with the application delivery controller 120 and a client device (e.g., a computing device 114) separately to secure access to a web services server 128. Additionally, the authorization module 126 may assign tokens and communicate the tokens with a client device, as described in further detail herein.

In one implementation, the authorization module 126 registers users including one or more of a medical service provider, node personnel, and a patient. In one implementation, registering a medical service provider includes receiving a medical service provider login. For example, the authorization module 126 may register a medical service provider when the authorization module 126 receives, from the hub 110, a login request associated with a medical service provider and determines to allow the login (e.g., by assigning a valid token, as described elsewhere herein). In one implementation, registering a medical service provider includes maintaining a medical service provider account including roles for medical service providers. In one implementation, a medical service provider account includes information regarding one or more of the associated medical service provider's education, experience, medical specialty, and roles.

In one implementation, the authorization module 126 registers node personnel. In one implementation, registering node personnel includes receiving a node personnel login. For example, in one implementation, the authorization module 126 registers a technician at the node 108 when the authorization module 126 receives, from the node 108 (e.g., via the application delivery controller 120, as described herein), a login request associated with the technician and determines to allow the login (e.g., by assigning a valid token, as described elsewhere herein). In one implementation, registering node personnel includes maintaining a node personnel account including roles for node personnel.

In one implementation, the authorization module 126 registers patients. In one implementation, registering a patient includes using a virtual doctor module to triage and/or treat the patient. A virtual doctor module (not shown) may be code and routines executable by a processor for triaging and/or treating patients located at a node 108. For example, assume a patient has arrived at the node 108 seeking a medical consultation, in one implementation, the authorization module 126 registers the patient by passing a patient check-in signal to a virtual doctor module and the virtual doctor module determines how to treat the patient. In one implementation, registering a patient includes patient intake. For example, assume a patient has arrived at the node 108 seeking a medical consultation, in one implementation, the authorization module 126 registers the patient by requesting to update the patient's electronic medical record in the storage 106 or (if the patient is new) requesting to create a new electronic medical record in the storage 106. Additionally, role based access levels for a patient may be assigned and maintained.

In one implementation, the authorization module 126 registers users and issues a token to each user. For example, a nurse at the node 108 provides registration information, including for example a login/password or an authorized certificate, and the authorization module 126 issues a token for the nurse. In some implementations, the web services server 128*n* generates the token and the authorization module 126 uses the token to verify the identity of the user before providing the user with access to the web services 130*n*. The token is used to identify a user's identity. The authentication process can be implemented as a sign-on process (e.g., a process that supports ID as a service) or over HTTPS. The operation of the authorization module 126 for assigning tokens is described in further detail throughout this specification, for example, in FIGS. 7 and 8.

FIG. 1 illustrates the authorization module 126 as being part of web services server 128*b*. In another implementation, the authorization module 126 and its functionality are operational on one or more components of the system 100 (e.g., across the node 108, the hub 110, and/or the web services server 128). Distributing functionality in different servers may be helpful in a load balancing deployment topology.

The application delivery controller (ADC) 120 may include a hardware or software mechanism for routing services. As depicted in the example of FIG. 1, the application delivery controller 120 sits between the network 102 and web services servers 128 to receive service requests and route the web services 130 to external computing devices (e.g., the computing device 114 at node 108 or hub 110). In some implementations, the system 100 may include a firewall between the web services server 128 and the network 102. In such implementations, the application delivery controller 120 may be located between the firewall and the web services server 128. The application delivery controller 120 may provide a single interface between one or more inner services (e.g., those services behind a firewall, such as the web services server 128, and/or other services) and the network 102 in order to act as a bridge between the inner services and exterior computing devices.

In some implementations, the application delivery controller 120 simplifies the system 100 by maintaining transport layer security (TLS) sessions with client devices across the network 102. In the absence of the application delivery controller 120, the client devices would have to establish sessions with each service, the maintenance of which would be an arduous task. Accordingly, by using the application delivery controller 120 as an interface between services and client devices, maintenance and computing resource usage are substantially reduced.

Figure 8A:
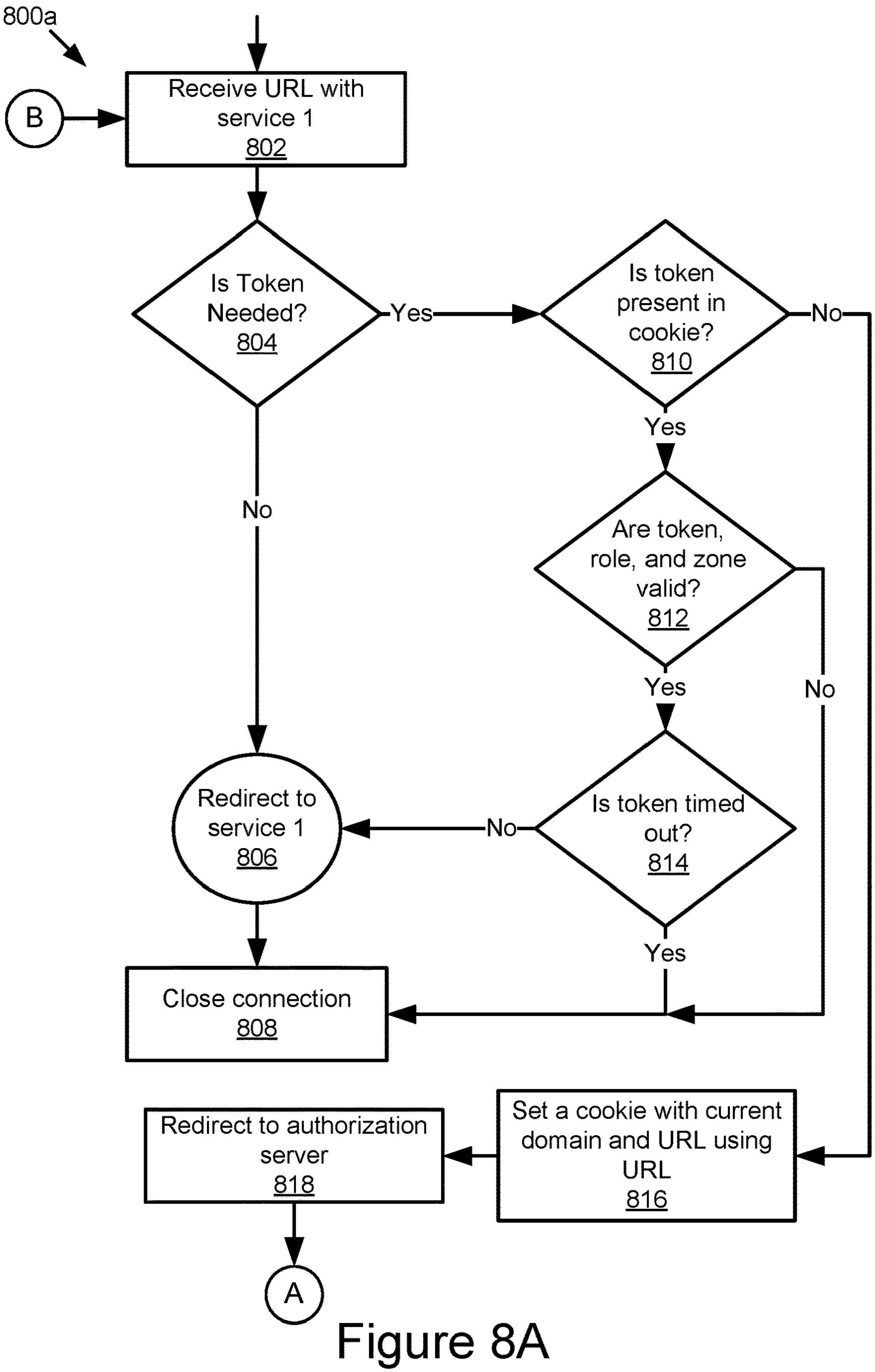
FIGS. 8A-8B illustrate a flow chart of an example workflow for validating a token from a client device or assigning and validating a token if a token is required but not present on the client device according to some implementations of the techniques described herein.
Figure 8B:
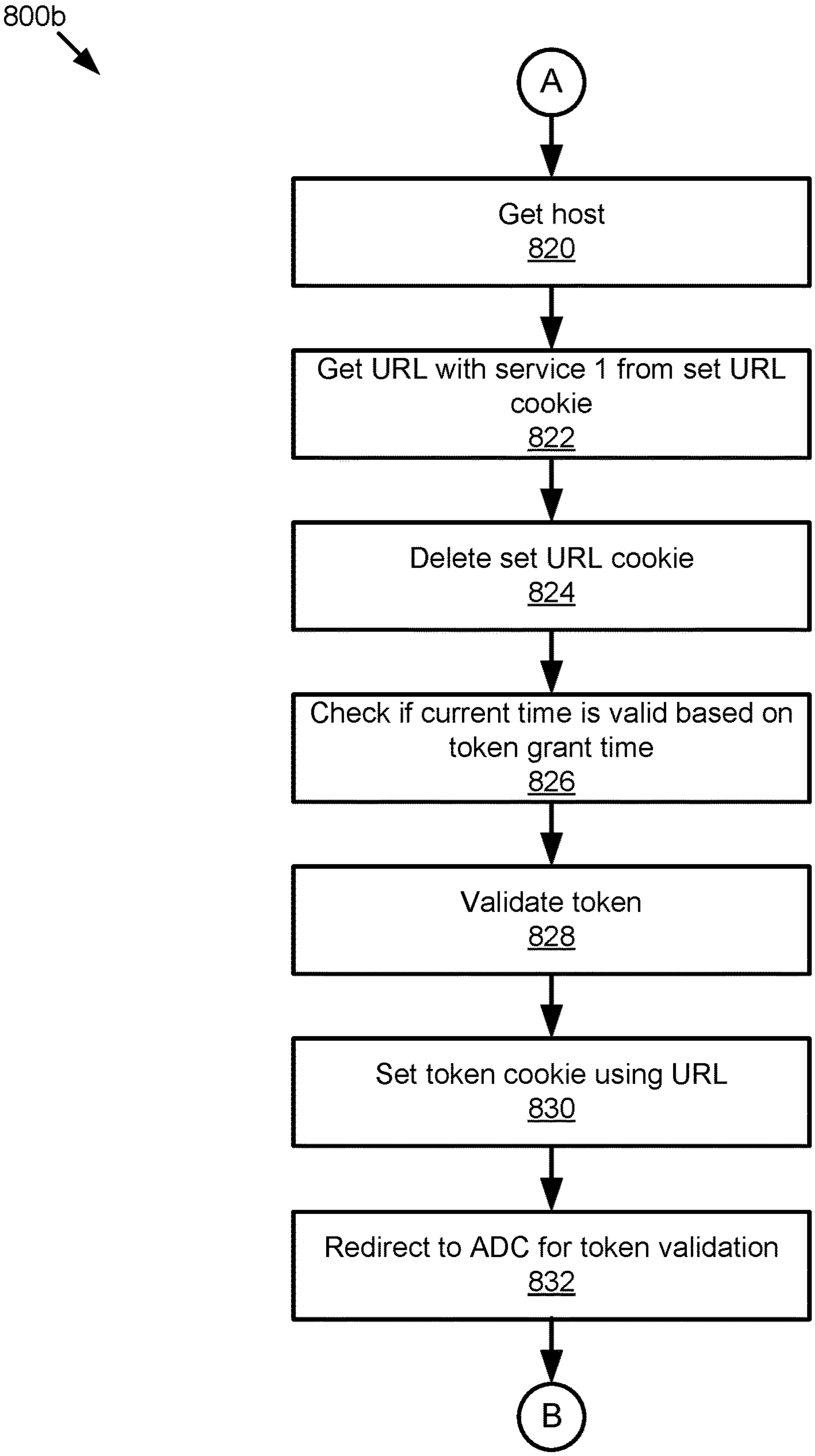

In some implementations, multiple application delivery controllers 120 may be deployed in a parallel hierarchy, for example, as described in reference to FIGS. 8A and 8B. Using such configurations of application delivery controllers 120 may provide higher granularity of security, load balancing, etc., as described elsewhere herein.

In one implementation, web services 130 are provided by the web services server 128. In one implementation, the web services 130 includes multiple, distributed modules that cooperate with each other to perform the functions described herein. Examples of services include a virtual doctor module, a video service, a queuing service, an electronic medical records service, and other services mentioned herein, but it should be understood that other services are possible and contemplated in the techniques described herein. Further, some services may have associated thereto one or more categories. For example, a particular service may have a streaming category, which keeps a socket connection open as long as the streaming data is received by the application delivery controller 120 from the particular service. Similarly, some services may have associated thereto one or more protocols. For example, a particular service may use HTTP to communicate with the application delivery controller 120, but the application delivery controller 120 provides HTTPS access by a client device to that service.

The network 102 may enable communications between the nodes 108, the electronic medical record server 104, the hubs 110, and the application delivery controller 120. Thus, the network 102 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 102 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 102 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In another implementation, the entities can use custom and/or dedicated data communications technologies instead of, or in addition to, the ones described above. Depending upon the implementation, the network 102 can also include links to other networks.

In one implementation, the network 102 is a partially public or a wholly public network, for example, the Internet. The network 102 can also be a private network or include one or more distinct or logical private networks (e.g., virtual private networks, Wide Area Networks (WAN) and/or Local Area Networks (LAN)). Additionally, the communication links to and from the network 102 can be wireline or wireless (i.e., terrestrial or satellite-based transceivers). In one implementation, the network 102 is an IP-based wide or metropolitan area network.

In one implementation, web services server **128*n* includes optional storage 106. In one implementation, storage 106 is a database that includes electronic medical records for patients of the system 100. In one implementation, each time a node 108 or hub 110 transmits information about a patient, storage 106** updates that patient's electronic medical record.

In one implementation, the node 108 is where patients receive a medical consultation and may include a computing device **114*a* and various medical devices 112. In one implementation, the node 108 is located remotely from the hubs 110. For example, the node 108 is a facility physically located in a rural area and a hub 110 is physically located in a city or other metropolitan area. In another example, the node 108 is a patient's home and the hub 110 is a nearby hospital. It will be recognized that the preceding are merely examples of a node 108 located remotely from a hub and that other examples exist. In one implementation, the node 108 is mobile. For example, the node 108 is a vehicle with a computing device 114*a* and medical devices 112, which travels to various locations and patients receive medical consultations at the vehicle. Examples of medical devices 112** include, but are not limited to, a stethoscope, a blood pressure meter, a pulse oximeter, a thermometer, an ophthalmoscope, a weight and height scale, an otoscope, a camera, a telecardiology device (e.g., an ECG machine), a telepathology device (e.g., a microscope), a teledermatology device (e.g., a high-resolution camera), a teleradiology device (e.g., an ultrasound machine), etc.

In one implementation, one or more of the medical devices 112 are integrated with the node 108. In one implementation, an integrated medical device is communicatively coupled to the node 108 to enable store and forward functionality. For example, in one implementation, an integrated medical device 112 is communicatively coupled to the node's computing device **114*a* to automatically send the output of the integrated medical device 112 to the computing device 114*a*. The integrated medical device output is captured by software on the node's computing device 114*a* and automatically forwarded to the electronic medical record server 104 according to one implementation. Such an implementation may beneficially reduce errors from node personnel misreading the medical device 112 and transcription errors from node personnel miss-recording the output of the medical device 112**.

Store and forward is an asynchronous, non-interactive form of telemedicine. In one implementation, store and forward is applied when the patient and doctor are not available at the same time. For example, in one implementation, patient data is collected or acquired by the node 108 and stored on a computing device **114*a* at the node 108, and then forwarded to a hub doctor via the network 102**. The hub doctor, at a later time, reviews the information and responds with a diagnosis, recommendations, requests for additional information etc.

In some implementations, the node 108 uses store and forward when there is no direct connectivity between the node 108 and the hub 110. The node 108 stores a local copy of the patient data and synchronizes with the hub 110 when the node 108 is connected to the network 102. This is particularly helpful because the node 108 can often experience poor network connections. For example, when a technician is out in a remote region helping patients, the technician can gather the patient data, wait until the node 108 has a better connection, sync up the data to the electronic medical record server 104 and a notification will be sent to the appropriate doctor to view the case and perform a diagnosis. After receiving the diagnosis from the doctor, the technician can give out prescribed medicine or perform additional lab-work requested for the patient.

The node 108 may be staffed by personnel to operate the computing device **114*a* and medical devices 112. For example, the personnel may be a nurse trained to use the medical devices 112 to obtain the patient's medical information and to use the computing device 114*a* to register the patient for medical consultation. In one implementation, the personnel at the node 108 is not as highly educated and/or is less specialized than the medical service provider at the hub 110**. For example, assume the node is staffed by one or more of a nurse, medical technician, lab technician, physician's assistant and the medical service provider is a doctor (e.g., a general practitioner or a specialist).

Staffing the node 108 with personnel that are not medical service providers may beneficially increase the effectiveness of each medical service provider in the system 100. For example, where there is a shortage of doctors in the region, each remote node 108 includes a medical technician, who may be trained more quickly than a doctor. In one implementation, the medical technician registers the patient, takes the patient's vital signs and uses additional medical devices 112 based on the complaint. Further, the node personnel may treat the patient for conditions not requiring care from a doctor. The doctor receives the medical information of the patient, which was gathered in part by the medical technician, and consults with the patient. For example, if the patient is complaining about a rash, the technician may use the high-resolution camera to take a picture of the problematic area, which the doctor may view and discuss with the patient. The doctor's effectiveness is therefore increased by allowing the medical service provider to spend more time consulting with and diagnosing patients and less time traveling to the various, remote locations of patients and performing less specialized tasks such as patient registration, gathering basic vital signs, etc.

The node 108 includes at least one computing device 114*a*. In one implementation, the computing device 114*a* is used by a patient at the node to access a medical service provider at the hub 110 for medical consultation. For example, the computing device 114*a* is a laptop computer, a desktop computer, a tablet computer, a mobile telephone, a personal digital assistant (PDA), a mobile email device, a television with one or more processors embedded therein or coupled thereto or any other electronic device capable of accessing the network 102.

In one implementation, the node 108 includes a video conference unit 116*a*. In one implementation, the video conference unit 116*a* is a hardware based solution. In another implementation, the video conference unit 116*a* is a software based solution. In one implementation, the video conference unit 116*a* is a computing device 116*a* including a web camera or other device for capturing video of the patient and video conferencing software. Regardless of the implementation, the video of the patient may be transmitted to the hub 110 after a telemedicine session with a live doctor is initiated. The video conference unit 116*a* used by a patient at the node 108 to access a medical service provider at the hub 110 for medical consultation is occasionally referred to herein as a consultation device.

In various implementations, a hub 110 may be any location a physician or other medical service provider (e.g., nurse practitioner, physician's assistant, or the like) connects to the advanced telemedicine system. For example, the hub 110 may be a doctor's office, hospital, other healthcare facility, a physician's home, or the like. In other implementations, the hub 110 may be a remote operations center where a team of doctors may monitor one or more patients connected to the telemedicine system. In one implementation, the remote operations center may be an intensivist hub where specially trained intensive care doctors monitor and consult with physicians and/or patients at a node 108 to treat patients with critical healthcare issues. The hub 110 connects with the nodes 108 and allows a medical service provider to remotely consult with and diagnose patients at a node 108 on an as needed basis using an information technology infrastructure. The hub's 110 information technology infrastructure includes, for example, a computing device 114*b*, a video conference unit 116*b*, a monitoring module 118, a digital clipboard, a monitor, a collaboration display, a printer, etc. The monitoring module 118 allows a physician or other medical service provider to monitor the operations of the virtual doctor module and intervene if the situation should warrant a telemedicine session with a live doctor.

The hub 110 includes at least one computing device 114*b*. In one implementation, the computing device 114*b* is used by the medical service provider at the hub 110 to access patient information and consult with a patient at the node 108. For example, the computing device 114*b* is a laptop computer, a desktop computer, a tablet computer, a mobile telephone, a personal digital assistant (PDA), a mobile email device, a television with one or more processors embedded therein or coupled thereto or any other electronic device capable of accessing the network 102. The hub 110 includes software, for example, that allows doctors to log into the system, search for patients, schedule patients, order prescriptions, make notes, perform video conferencing, generate reports and perform analytics, and monitor virtual doctor sessions.

In one implementation, the hub 110 includes a video conference unit 116*b*. In one implementation, the video conference unit 116*b* is a hardware based solution. In another implementation, the video conference device 116*b* is a software based solution. In one implementation, the video conference unit is a computing device 114*b* including a web camera or other device for capturing video of the medical service provider and video conferencing software. Regardless of the implementation, the video of the medical service provider is transmitted to the node 108 when the medical service provider is consulting with a patient at the node 108.

By allowing remote consultation of a patient at a node by a medical service provider at a hub, the medical service provider is more effectively used and patients may receive higher quality medical care. For example, assume the medical service provider is a cardiologist in a major city where the hub 110 is located. Also assume that a patient located in a rural location far from the city is having heart related problems. In one implementation, the hub allows the cardiologist to remotely consult with and diagnose the rurally located patient without traveling to the patient's location. Therefore, the cardiologist may use the time the cardiologist would have spent traveling to the patient to consult with and diagnose additional patients thereby increasing the utilization of the cardiologist. Moreover, the rural patient is allowed to consult with and be diagnosed by a specialist (e.g., a cardiologist), which may not have otherwise been an option for the patient thereby increasing the quality of medical care the patient receives. It will be recognized that the preceding is merely an example of how remote consultation of a patient at a node 108 by a medical service provider at a hub 110 may increase usage of a medical service provider and increase the quality of medical care a patient receives.

Figure 2:
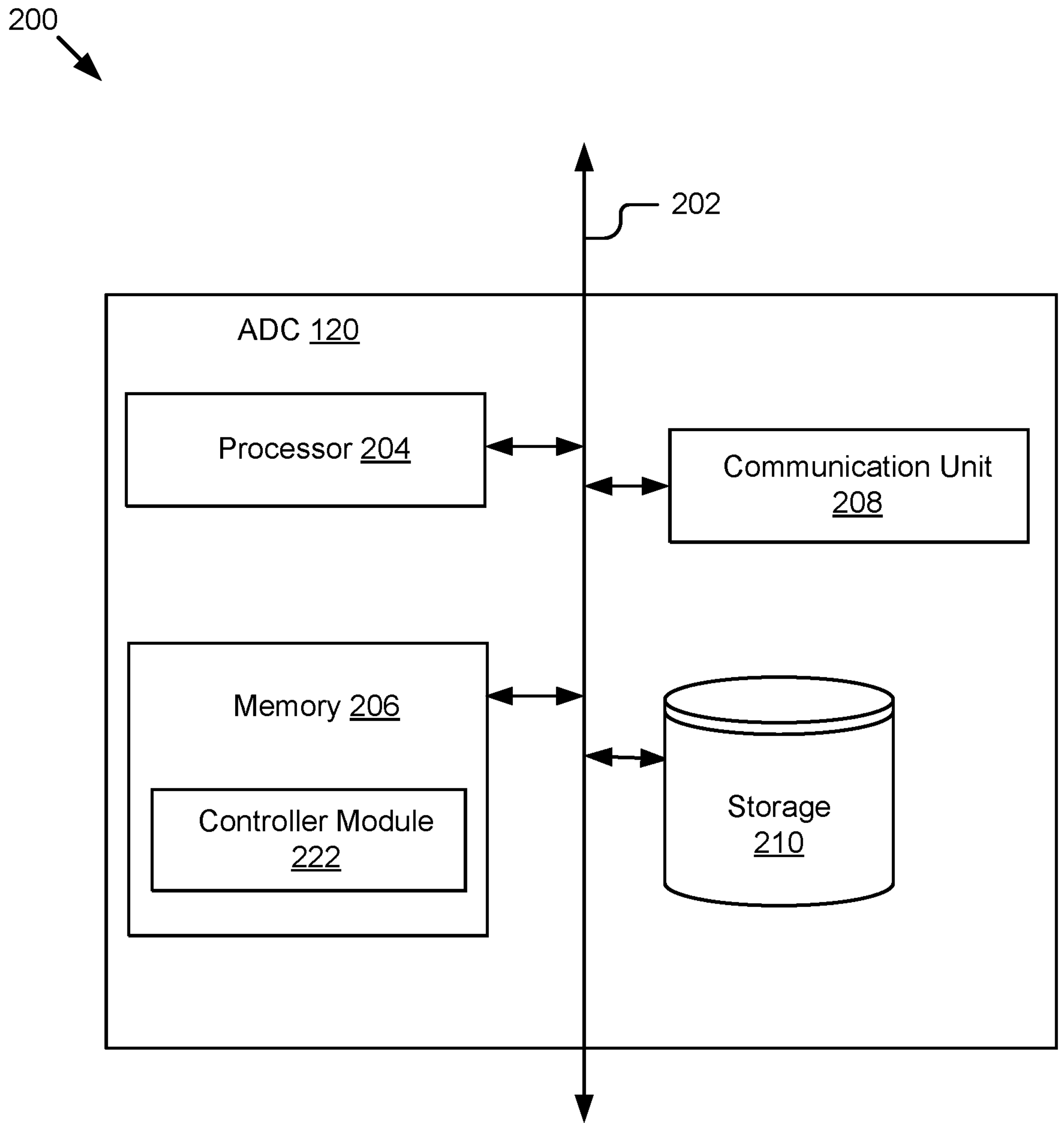
FIG. 2 illustrates a block diagram of an example application delivery controller according to some implementations of the techniques described herein.

FIG. 2 is a block diagram 200 of an application delivery controller 120 according to some implementation of the techniques described herein. It should be noted that, although the application delivery controller 120 is illustrated as being a specialized hardware computing device/server, it may be implemented as a software module executable on a processor or a combination of hardware and software. As illustrated in FIG. 2, the application delivery controller 120 includes a processor 204, a memory 206, communications unit 208, and storage 210 coupled to a bus 202. In one implementation, the functionality of the bus 202 is provided by an interconnecting chipset.

The communication unit 208 receives data from the nodes 108, the hubs 110 and the electronic medical record server 104. The communication unit 208 is coupled to the bus 202. In one implementation, the communication unit 208 includes a port for direct physical connection to the network 102 or to another communication channel. In another implementation, the communication unit 208 includes a wireless transceiver for exchanging data with the network 102, or with another communication channel, using one or more wireless communication methods.

The processor 204 may be any general-purpose processor. The processor 204 comprises an arithmetic logic unit, a microprocessor, a general purpose controller or some other processor array to perform computations and execute code and routines. The processor 204 is coupled to the bus 202 for communication with the other components of the web services server 128. Processor 204 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It will be apparent to one skilled in the art that other processors, operating systems, sensors, displays and physical configurations are possible.

The memory 206 is a non-transitory storage medium. The memory 206 holds instructions and/or data that may be executed by the processor 204. In one implementation, the instructions and/or data stored on the memory 206 comprise code for performing any and/or all of the techniques described herein. The memory 206 may be a dynamic random access memory (DRAM) device, a static random access memory (SRAM) device, flash memory or some other memory device known in the art. In one implementation, the memory 206 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 206 is coupled to the bus 202 for communication with the other components of the application delivery controller 120. In one implementation, the controller module 222 is stored in memory 206 and executable by the processor 204.

The controller module 222 is code and routines executable by the processor 204 for providing functionality of the application delivery controller 120. In one implementation, the controller module 222 is a set of instructions executable by the processor 204. In another implementation, the controller module 222 is stored in the memory 206 and is accessible and executable by the processor 204. For the purposes of this disclosure, the functionality of the application delivery controller 120 may be performed by one or more components of the application delivery controller 120, such as the controller module, although other implementations are possible, for example, additional, fewer, or different components may be used.

The storage device 210 is any device capable of holding data, for example, a hard drive or a solid-state memory device. The storage device 210 is a non-volatile memory device or similar permanent storage device and media. In one implementation, the storage device 210 stores data and information of the application delivery controller 120. In some implementations, one or more of the routing and service tables, as described herein, may be stored in the storage 210.

As used herein, the term module refers to computer program logic utilized to provide the specified functionality. Thus, a module can be implemented in hardware, firmware, and/or software. In one implementation, program modules are stored on the storage device 210, loaded into the memory 206 and executed by the processor 204. Implementations of the entities described herein can include other and/or different modules than the ones described here. In addition, the functionality attributed to the modules can be performed by other or different modules in other implementations. Moreover, this description occasionally omits the term module for purposes of clarity and convenience.

It should be noted that the components 202-210 described in reference to the application delivery controller 120 may also be used to execute the web services 130, the authorization module 126, and/or storage 106.

FIGS. 3A and 3B respectively illustrate an example routing table 300*a* and an example service table 300*b* for providing services via the application delivery controller 120. Rather than a single monolithic application, applications in modern systems may be loosely coupled into a set of services which are offered in a modular way over a distribution of systems. In some implementations, the application delivery controller 120 provides a single point of contact or interface via which client devices connect to a set of applications or services, agnostic of the architecture of backend services (e.g., the web services 130).

The application delivery controller 120 may accomplish service routing by maintaining data structures (e.g., in the storage 210). These data structures may include a routing table and, in some implementations, a service table. The routing table captures routing information for various services and the service table provides information for those services. The routing table and service table are linked by a service definition. In instances where information is different between the two tables, the data in the service table may overrule the data in the routing table.

The application delivery controller 120 may be configured to reload the information in the routing table and the service table, for example, at runtime or dynamically in response to a reload service known to the application delivery controller 120. The reload service may reload the entirety of a routing or service table. For example, if an error has occurred at a given node 108 or a service or routing table needs to be updated (e.g., due to a new service or a change to information regarding a service), the reload service allows the routing and/or service tables to be refreshed to have updated and accurate routing information.

In some implementations, the routing and/or service tables may include the specific order and presence of information as shown in FIGS. 3A and 3B, but it should be understood that other implementations are possible. In various embodiments, routing and service tables may be specific to a particular domain, meaning a user can have different privileges on various domains or could even be non-existent on a domain's whitelist. Further, a single instance of an application delivery controller may include routing and service tables for multiple domains. In some implementations, the routing and service tables specific to different domains are differentiated by different routing table and service table names. Further, in some implementations, generic routing and service tables, not tied to any domain and common to many domains, may be maintained by an application delivery controller.

FIG. 3A illustrates an example routing table 300*a* for providing services via the application delivery controller 120 according to some implementations of the techniques described herein. In the example routing table, each line may include several data types, which may be separated by a single space, multiple spaces, tabs, etc. The example routing table 300*a* includes entries for a service, including SERVICE 302, DSTIP 304, DSTPORT 306, PROTOCOL 308, STRP 310, TYPE 312, SRVCDEFINITION 314, TOKENNEEDED 316, WLROLES 318, and SECURITYZONE 320. SERVICE 302 represents the name of a service sought by the client (e.g., the requested service). DSTIP 304 represents the destination IP address to which the service request is to be routed, that is, the IP address at which the service is hosted. DSTPORT 306 represents the destination port on which the service is hosted. PROTOCOL 308 represents a type of connection protocol to be established between the application delivery controller 120 and the service. STRP 310 is specific to the application delivery controller 120 and indicates whether or not to strip a prefix in a command, for example, as described in reference to FIGS. 6A and 6B. TYPE 312 indicates a category of application programming interface (API) call. In some implementations, a category may be defined as (and, in some implementations, restricted to) one of the following: "normal," "getstream," "poststream," "event," "reset," "secure," and "token." Example categories are described in further detail elsewhere herein. SRVCDEFINITION 314 represents the definition of a service and may serve as a link between a routing table (e.g., routing table 300*a*) and a service table (e.g., service table 300*b*). TOKENNEEDED 316 indicates whether access to the service requires a token (e.g., as described elsewhere herein). In some implementations, if TOKENNEEDED 316 has a value of 1, then a token is required, but if TOKENNEEDED 316 has a value of 0, then no token is required and the service has free access without token validation or other authorization check, which may be useful to provide rapid access in emergencies, as discussed elsewhere herein. WLROLES 318 indicates one or more roles (e.g., which may be separated by commas), which are whitelisted for the service. A role or user that is whitelisted for a service indicates which users may be granted access to the service. SECURITYZONE 320 represents a security zone that a service or API call belongs to, as described in further detail below.

FIG. 3B illustrates an example service table 300*b* for providing services via the application delivery controller 120 according to some implementations of the techniques described herein. The example service table 300*b* includes entries for a service, including SERVICENAME 352, METHOD 354, API 356, TYPE 360, TOKENNEEDED 360, WLROLES 362, and SECURITYZONE 364. SERVICE NAME 352 corresponds to the SRVCDEFINITION 314 of the routing table. METHOD 354 represents one of several possible incoming methods or commands, such as get, post, put, head, delete, connect, trace, options, etc. API 356 represents the requested application programming interface from the requester and may be included in the URL.

SECURITYZONE 364 is the same as SECURITYZONE 320 listed in the routing table, but may include a different value. If the value of SECURITYZONE 364 in the service table 300*b* is different than the SECURITYZONE 320 in the routing table 320, then the security zone in the routing table will be used. For example, if a client is attempting to post (e.g., the METHOD 354) to the service corresponding to Stream3 (e.g., as listed in the SERVICE 302), then the security zone may call for additional security verification. By differentiating between the methods, the application delivery controller 120 provides increased granularity to security (e.g., specific roles may have access to different methods or APIs within a service). In the example, while a technologist (e.g., a nurse) may have access to get a livestream, an admin may have access to post a livestream.

In an example, every service may have a set of APIs, which may have exceptions (e.g., modifications to default values). In a service called Stream3 on a streaming server, a doctor may have access for a first method and API, an administrator and a technologist may have access for a second method and API, and an administrator may have access for a third method and API. For example, there may be certain exceptions based on method and API (e.g., a doctor may have standard access to a service, but an administrator may have access to a particular method of that service). In one implementation, treatment of an API is performed by parsing the URL. For instance, the application delivery controller 120 may parse a URL, such as domainname/servicename/API, to determine the service and API.

As an example use scenario of a routing table and service table by the application delivery controller 120, the application delivery controller 120 receives a service request in the form of a URL, for example, using an HTTPS port. The application delivery controller 120 finds the service name in the URL (e.g., if the URL is www.domain.com/stream3/livestream, then the service name might appear immediately after the domain, so in this example stream3 would be the service name). The application delivery controller 120 may also find the API in the URL (e.g., in the previous example, livestream would be the API). The application delivery controller 120 may check if the specific service name presented in the URL is present in the routing table in order to determine whether to handle the routing. If the application delivery controller 120 finds an entry for the service name (e.g., in the SERVICE 302 field) in the routing table (e.g., routing table 300*a*), then the application delivery controller 120 may load the destination IP (e.g., in the DSTIP 304 field), the destination port (e.g., in the DSTPORT 306 field), the protocol (e.g., in the PROTOCOL 308 field), the category of the command to be called (e.g., in the TYPE 312 field), etc.

The application delivery controller 120 may check whether or not the given API name (e.g., livestream) is present in a service table (e.g., service table 300*b*). In some implementations, the application delivery controller 120 may find one or more service table (e.g., service table 300*b*) entries corresponding to the service definition (e.g., in the SRVCDEFINITION 314 field) of the service. If the service table information is present, then the application delivery controller 120 may check the method (e.g., in the METHOD 354 field) and API (e.g., in the API 356 field) combination in the URL, the white list roles (e.g., in the WLROLES 362 field), the zones of security (e.g., in the SECURITYZONE 364 field), the need of a token (e.g., in the TOKENNEEDED 360 field), and the category (e.g., in the TYPE 358 field).

In some implementations, if the application delivery controller 120 finds the service name in the routing table, but does not find the requested method/API in the service table, then the application delivery controller 120 determines that there is no granular information for the requested method and the default values in the routing table are used. Accordingly, values in the service table may override the values in the routing table, if present; however, if there are no such values or entry in a service table, then the default values in the routing table are used.

Figure 4:
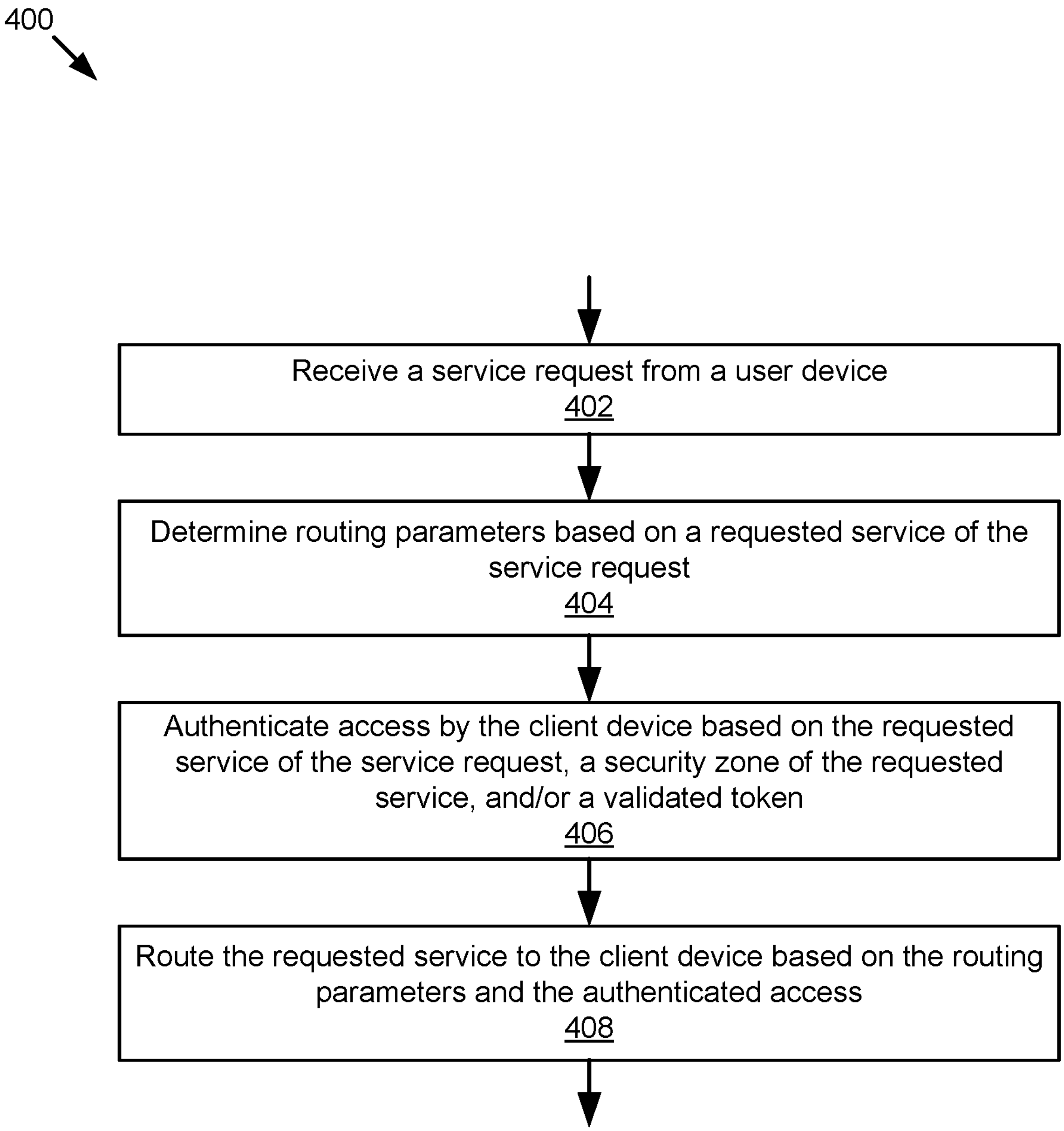
FIG. 4 illustrates a flow chart of an example method for routing a service using an application delivery controller according to some implementations of the techniques described herein.

FIG. 4 illustrates a flow chart of an example method 400 for routing a service using an application delivery controller 120 according to some implementations of the techniques described herein. At 402, the application delivery controller 120 may receive a service request from a client device. In some implementations, the service request is received in the form of a URL, as described in further detail elsewhere herein.

At 404, the application delivery controller 120 may determine routing parameters based on a requested service of the service request. In some implementations, the routing parameters are determined using a routing and or service table, for example, as described in reference to FIGS. 3A and 3B. The process for determining parameters is described in further detail in reference to FIG. 5.

At 404, the application delivery controller 120 may authenticate access by the client device based on the requested service of the service request, a security zone of the requested service, and/or a validated token. The determination of whether and which of the security zone, token, etc., are called for can be determined based on the routing and service tables, for example, as described in reference to FIGS. 3A and 3B. The process for authenticating access is described in further detail in reference to FIGS. 7-8B.

At 406, the application delivery controller 120 may route the requested service to the client device based on the routing parameters and the authenticated access.

Figure 5:
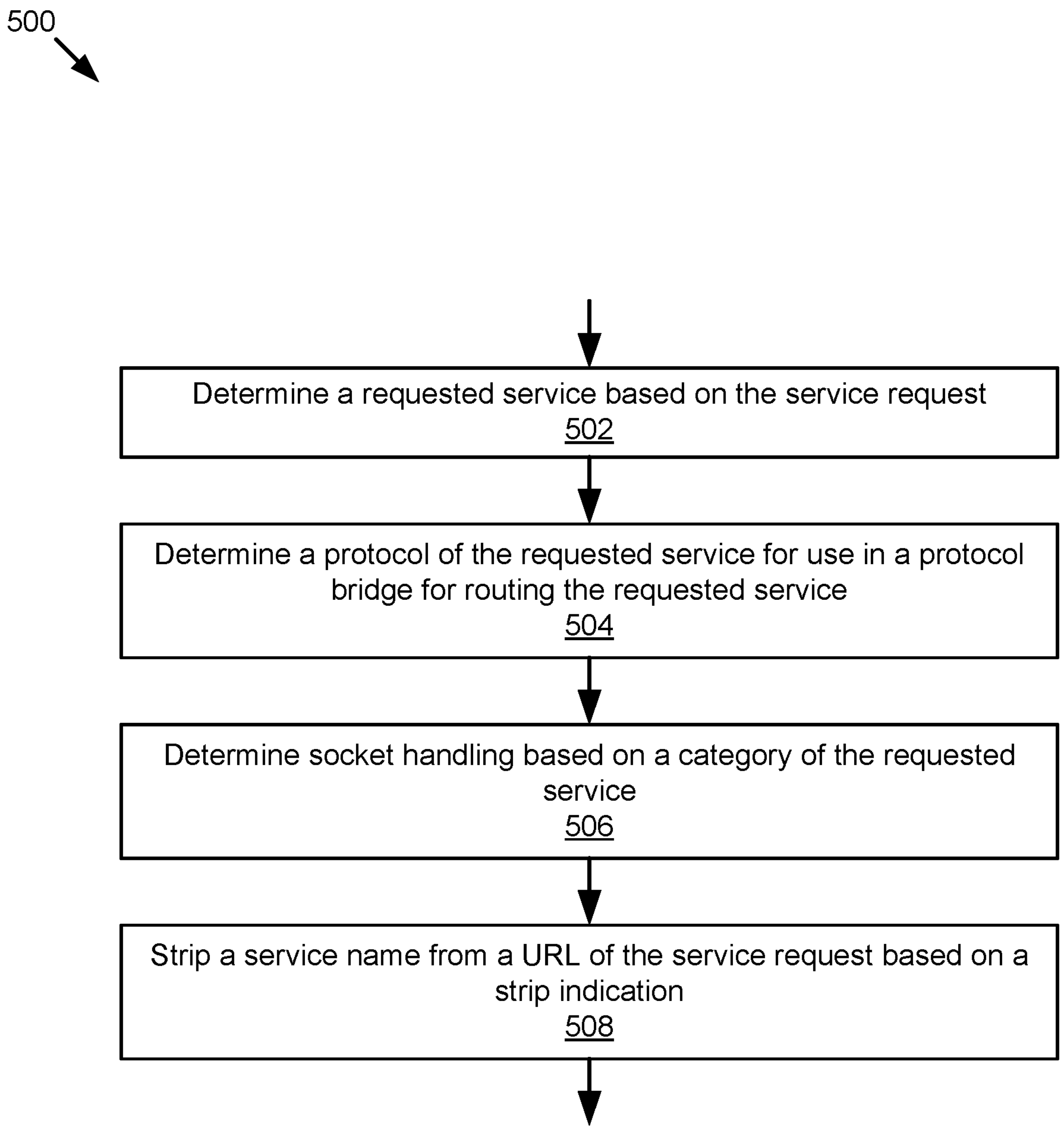
FIG. 5 illustrates a flow chart of an example method for determining routing parameters for a requested service according to some implementations of the techniques described herein.

FIG. 5 illustrates a flow chart of an example method 500 for determining routing parameters for a requested service according to some implementations of the techniques described herein. The example method 500 may represent additional detail for performing the operations at 404 in FIG. 4. At 502, the application delivery controller 120 may determine a requested service based on the service request. In some implementations, the application delivery controller 120 determines the requested service using a URL of the service request, as described above.

At 504, the application delivery controller 120 may determine a protocol of the requested service for use in a protocol bridge for routing the requested service. For example, in some implementations, the application delivery controller 120 may determine the protocol from the routing table (e.g., from the PROTOCOL 308 field of routing table 300*a*). For example, the protocol may include HTTP or HTTPS. In some implementations, when the application delivery controller 120 provides a protocol bridge, the application delivery controller 120 may provide a single HTTPS interface to client devices (e.g., those accessing the web services 130 via the network 102), but either an HTTP or HTTPS interface to web services 130. Accordingly, web services 130 (or the electronic medical record server 104, etc.) may maintain an HTTP interface without having to necessarily meet HTTPS security (e.g., having a certificate at each of the web services 130) and simplifying certificate management for HTTPS.

In instances where the protocol calls for HTTP to the requested service, the application delivery controller 120 may provide an HTTPS to HTTP bridge. The application delivery controller 120 may act as a secure bridge between the client device and the requested service. For example, this bridge may be accomplished by setting up an HTTPS OpenSSL connection between the client device and the application delivery controller 120 and an HTTP connection to the web services 130 within a trusted network (e.g., the connection between the application delivery controller 120 and the web services server 128).

In instances where the protocol calls for HTTPS to the requested service, the application delivery controller 120 may provide an interface with a secure connection from the application delivery controller 120 within a trusted network (e.g., as in a connection to the authorization module 126 on web services server 128*b*). Accordingly, the application delivery controller 120 may be configured to provide an HTTPS connection to both external and internal devices.

At 506, the application delivery controller 120 may determine socket handling based on a category of the requested service. In some implementations, the application delivery controller 120 may determine the category from the routing table (e.g., from the TYPE 312 field in routing table 300*a*). Services may vary, so each service may be assigned a category which will enable socket handling to be tailored to that service in a more granular way than in current systems. The socket handling associated with each category enables the application delivery controller 120 to be much more versatile than existing systems, which may only handle communication according to a single type of socket handling, such as that corresponding to the normal category.

Example categories may include normal, streaming, event, secure, reset, and token. In the normal category, the outgoing connection path is constantly live, while the return path is kept alive based on the content length, such that the end of the socket communication on the return path depends on the content length. In the streaming category, the socket connection is alive as long as the streaming data keeps reaching the application delivery controller 120. In the event category, the socket communication is kept open until the end of the data (e.g., as marked by \r\n) is received. In the secure category, the connection from the application delivery controller 120 within a trusted network may be HTTPS. The secure category may be used in implementations where multiple application delivery controllers are present (e.g., as described in reference to FIGS. 6A and 6B), where internal communications (e.g., those within a trusted network such as between the web services server 128 and the application delivery controller 120) need to be secure, etc. The reset category is an internal category supported by the application delivery controller 120 to dynamically reconfigure itself. The token category is an internal category supported by the application delivery controller 120 to handle an incoming token from the authorization module 126, for example, as described below.

In some implementations, the application delivery controller 120 may be configured to handle each of these categories because of the range of services that it supports. For example, for services in the streaming category, streaming audio or video may be handled differently for load balancing and the application delivery controller 120 may continue sending data as long as the data is available to send. In another example, for an event, the streaming socket handler would be a poor fit, because the application delivery controller 120 would have to parse the incoming data stream until it finds the end marker (e.g., the \r\n). Accordingly, due to the variety of services handled by the application delivery controller 120, the category may be a service attribute in a routing or service table to indicate socket handling for each type of service.

Returning to FIG. 5, at 508, the application delivery controller 120 may strip a service name from a URL of the service request based on the strip indication (e.g., in the STRP 310 field in routing table 300*a*). The strip indication represents an internal operation to the application delivery controller 120. There are certain commands (e.g., service requests) in which the service name is part of the command and is passed to lower layer services, but other commands in which there is no need for a service name to be passed to lower layer services. For instance, the strip indication either retains the service name in a command packet (e.g., if the value in STRP 310 is 0) or strips the service name from the command packet (e.g., if the value in STRP 310 is 0).

In some implementations, the strip operation is enabled (e.g., the name of the service is removed from a command/request packet/URL) due to the fact that once the command packet's destination service is determined using the service name and the command packet is routed to that specific service, there is no need to use the service name again. However, in some instances, the strip operation is disabled (e.g., the name of the service is not removed from the command packet), so that the service name can be used again. One such instance where the strip operation may be disabled is when there are multiple application delivery controllers 120 (e.g., especially at the same level of hierarchy), such as is described in reference to FIGS. 6A and 6B, so that the appropriate application delivery controllers can determine the service name from the command packet.

Figure 6A:
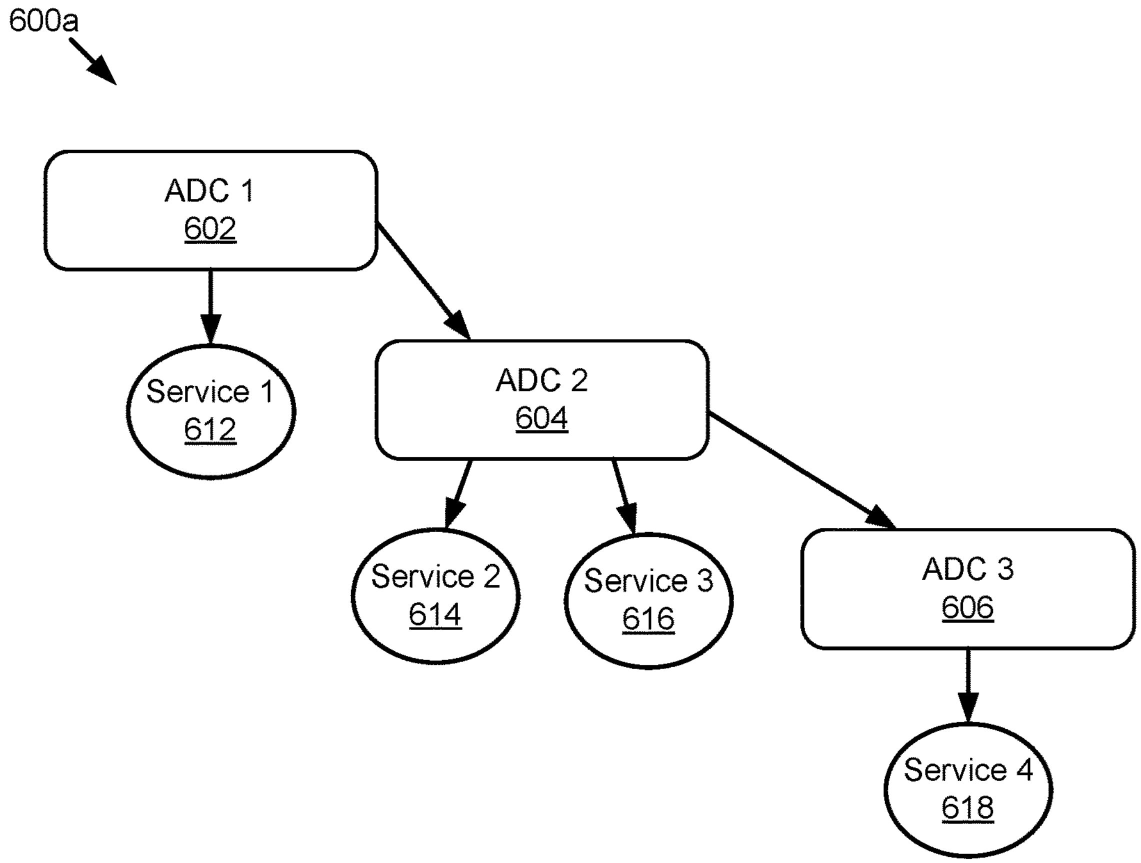
FIGS. 6A-6B illustrate block diagrams of example cascaded and parallel implementations of multiple application delivery controllers according to some implementations of the techniques described herein.

Routing of services through one or more application delivery controllers 120 may be accomplished in multiple ways. In FIG. 6A, the block diagram 600*a* shows an implementation of multiple application delivery controllers 602, 604, and 606 in a hierarchical or cascaded structure according to some implementations of the techniques described herein. For example, the application delivery controller 602 may route to service 1 at 612, application delivery controller 604 may route to service 2 at 614 and service 3 at 616, and application delivery controller 606 may route to service 4 at 618.

In some implementations, a service name can contain multiple services as a hierarchy (e.g., the command or URL can contain a compound service name containing multiple service names). For example, if a service name is ADC1.ADC2.ADC3.service4, then the command packet may be forwarded between each level of application delivery controllers and, if the strip operation is enabled, the service name gets stripped each time. For example, application delivery controller 1 at 602 may strip ADC1 from the service name, application delivery controller 2 at 604 may strip ADC2 from the service name, and application delivery controller 3 at 606 may strip ADC3. Ultimately, by the time the command packet has percolated through each level of the cascaded application delivery controllers to reach application delivery controller 3 at 606, the service name may be simply service4.

Figure 6B:
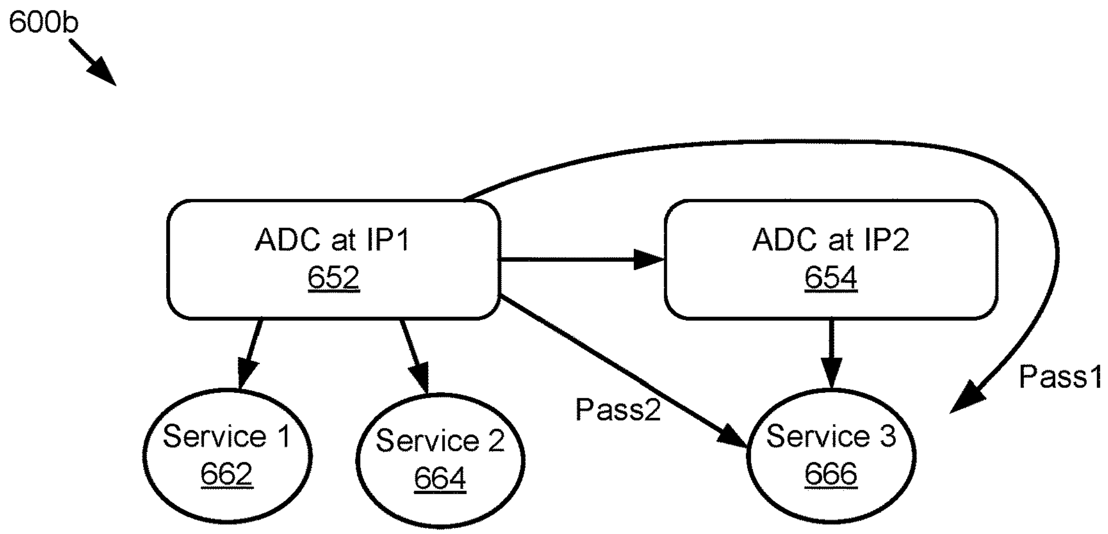

In FIG. 6B, the block diagram 600*b* shows an implementation of multiple application delivery controllers in parallel according to some implementations of the techniques described herein. The implementation of diagram 600*b* is particularly beneficial for high availability, disaster recovery deployment, and load balancing. For example, multiple application delivery controllers in parallel provide better redundancy for instances where there is a failure or high system demand. In the block diagram 600*b* application delivery controllers 652 and 654 are at the same level of hierarchy. Application delivery controllers 652 and 654 may represent two client facing application delivery controllers with the same name but different IP addresses to provide load balancing and provide duplicate paths in case of failure. Application delivery controller 652 at IP address 1 may route to service 1 at 662, service 2 at 664, and/or service 3 at 666, and application delivery controller 654 at IP address 2 may route to service 3 at 666 or to other services, depending on the implementation. In the example of FIG. 6B, a service request may include a service name of ADC1.service 3. As illustrated by "pass2," if a command packet is passed directly from application delivery controller 652 to service 3 at 666, then application delivery controller 652 may perform the strip operation. For example, as illustrated by "pass1," if a command packet is passed from application delivery controller 652 to application delivery controller 654 and then to service 3 at 666, then application delivery controller 652 will not perform a strip operation, but application delivery controller 654 will perform a strip operation. In an instance where application delivery controller 652 cannot access service 3 at 666 due to a connection failure, the application delivery controller 652 may communicate with service 3 at 666 through application delivery controller 654 or ask the client device to redirect to application delivery controller 654.

Figure 7:
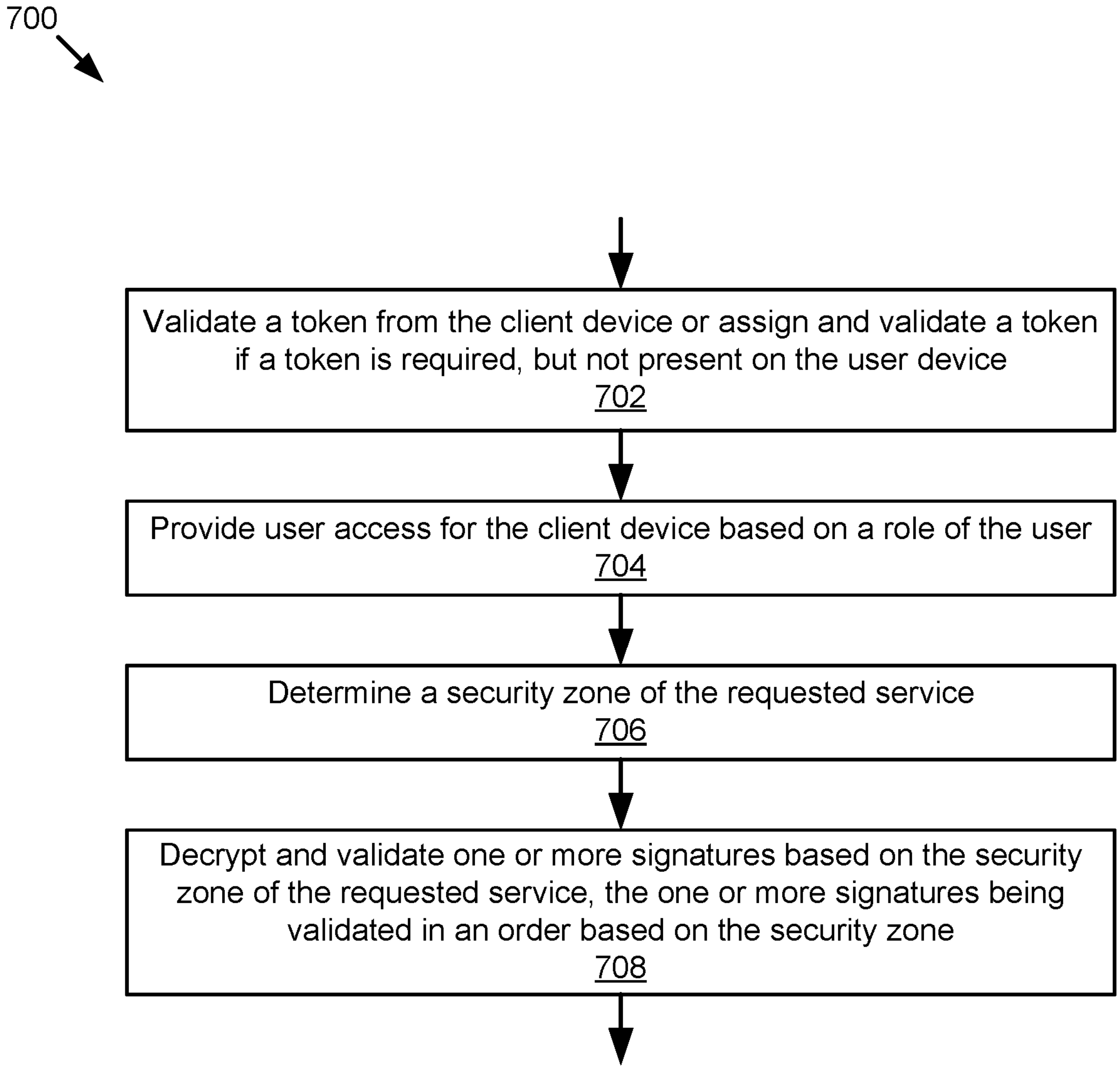
FIG. 7 illustrates a flow chart of an example method for authenticating access from a client device for a requested service according to some implementations of the techniques described herein.

FIG. 7 illustrates a flow chart of an example method 700 for authenticating access from a client device for a requested service according to some implementations of the techniques described herein. At 702 the application delivery controller 120 may validate a token by the client device or assign and validate a token if a token is required (e.g., as indicated in a routing or service table), but not present on the client device. Some services (or methods) require a token for security purposes while other services might not require a token for execution (e.g., non-security critical services, emergency services, etc.). Accordingly, the application delivery controller 120 may determine whether a token is required, whether a token is present on a client device, and whether the token is valid. If no token is present on the client device, the application delivery controller 120 may cooperate with the authorization module 126 to assign a token to the client device and validate the token. The validation or assignment and validation of a token are described in further detail elsewhere herein, especially in reference to FIGS. 8A and 8B.

At 704, the application delivery controller 120 may provide user access by the client device based on a role of the user. In some implementations, the role of the user may be defined using a whitelist. A whitelist may be a list of comma separated roles that are defined at each service and API levels for role based access (e.g., those roles or users listed are provided access to those services or methods). A whitelist ensures that certain cervices are accessible to a certain set of roles in order to augment the security of the system. There may be services to which no one is allowed access. Similarly, there may be services to which everyone is allowed access (for example, as indicated by the value in the TOKENNEEDED 316 field being set to 0).

As mentioned in reference to FIGS. 3A and 3B, a whitelist may be present at both the level of a routing table and a service table. A whitelist at a service table level (e.g., for an API or method level) offers more granular control over user access than a whitelist at a routing table level. For example, a service table level whitelist may override a routing table level whitelist to provide granular control over a user's access to specific methods or APIs defined in the service table.

At 706, the application delivery controller 120 may determine a security zone of the requested service and, at 708, the application delivery controller 120 may decrypt and validate one or more signatures based on the security zone of the requested service, the one or more signatures being validated in an order based on the security zone. In some implementations, the application delivery controller 120 provides multiple zones of security, where each zone of security includes increasingly secure tiers. For example, because some security levels are extremely computationally heavy, low security items or services do not call for levels of encryption that are as high as higher security items or services. The number of access requests to the highest level security will be much lower than those to a lower level security simply because the number of people who have access (e.g., based on roles) to the higher security is much lower than the number of people who have access to the lower security. For example, a lower tier security might use a SHA256 (SHA is a secure hash algorithm known in the art) based signature, but a higher security tier might use SHA512 coupled to a signature scheme, which might be a similar security level to 2042 bit RSA (RSA is an algorithm known in the art to encrypt and decrypt messages).

In some implementations, security is enhanced using random numbers known only to the application delivery controller 120 and the authorization module 126. For example, separate from a service request or service routing, the application delivery controller 120 and authorization module 126 may exchange random numbers. Due to the presence of the random numbers, weaker encryption may be used to decrease computing resources used while maintaining sufficient data security. The random numbers are described in further detail in reference to FIG. 10.

In some implementations, each service may be classified based on a security zone in a routing and/or service table. Each security zone may have different decryption schemes for signatures in increasing order of complexity and security strength. For example, a security zone 1 might need a first signature to be decrypted and validated before access is granted. A security zone 2 might need the first signature to be decrypted and validated then a second, higher security level signature to be decrypted and validated before access is granted. A security zone 3 might need the first and second signatures as well as a third, even higher security level signature to be decrypted and validated before access is granted. For example, each signature may have increasing security level, such as SHA256 for the first signature, SHA512 for the second signature, and RSA for the third signature.

The way that security zone decryptions are handled needs to be efficient due to the substantial computing resources used to decrypt higher security signatures in higher security zones. In some implementations, the application delivery controller 120 may decrypt and validate a lower level, lower resource intensive signature before proceeding to a higher level, more resource intensive signature. If any signature in the pipeline fails, the decryption is aborted before higher security signatures are verified, so computing resources used are decreased for attacks and still available for genuine authentication for access to services and/or data.

FIGS. 8A-8B illustrate a flow chart of an example workflow 800*a* and 800*b* for validating a token from a client device or assigning and validating a token if a token is required but not present on the client device according to some implementations of the techniques described herein. At 802, the application delivery controller 120 receives a URL with service 1. For example, the application delivery controller 120 may receive a service request with, or in the form of, a URL indicating a requested service 1.

At 804, the application delivery controller 120 determines whether a token is needed (e.g., using a routing or service table, as described above). If the application delivery controller 120 determines that a token is not needed then, at 806, the service is executed and/or routed to the client device. Some services do not have access to sensitive information, so no token is needed and, for efficiency purposes, assignment and validation of a token are bypassed.

In some implementations, the application delivery controller 120 may determine that no token is needed based on the requested service being an emergency service (or that a service is being requested in an emergency, e.g., as in the triage described elsewhere herein). For example, the application delivery controller 120 may be configured to handle a service in a crisis by bypassing the normal pipeline for processing for authentication and provide seamless, instantaneous routing of the service. For instance, emergency services may be marked such that no token is required (e.g., the TOKENNEEDED field 316 or 360 in routing table 300*a* or service table 300*b* for the emergency service has a value set to 0).

In one example, FIG. 9 illustrates example routing table 900 illustrating values for providing emergency services via the application delivery controller 120 according to some implementations of the techniques described herein. In FIG. 9, column 8 at 902 shows that service "eqs1" in row 904 has a value of 1 in the TOKENNEEDED field, indicating that a token is needed to access the service. Further, the service "eqs1" may be, by default, accessed by users with the roles of doctor, nurse, or transcriber. However, column 8 at 902 shows that service "emergencyeqs1" in row 906 has a value of 0 in the TOKENNEEDED field, so no token is required and authorization procedures can be bypassed. Accordingly, the same API may be used for both services but mapped onto different service names to provide for both an emergency case and a non-emergency case.

Returning to FIG. 8A, at 808, the application delivery controller 120 may close the connection (e.g., based on a socket handling, as described above).

If the application delivery controller 120 determines that a token is needed at 804 then, at 810, the application delivery controller may determine whether a token is present in a cookie on the client device. For example, the application delivery controller 120 may query the client device to determine if there is a token for the service in a cookie stored on the client device by the authorization server.

If the application delivery controller 120 determines at 810 that the token is present in the cookie, then, at 812, the application delivery controller 120 may determine whether the token, role, and security zone are valid. The application delivery controller 120 may validate the cookie along with the credentials of the user (e.g., the credentials may be part of the token) to verify that the token is valid and the user is who the user is claiming to be.

In some implementations, once the application delivery controller 120 receives the token in the cookie, the cookie is parsed for the presence of a key word (e.g., "token"). The key word may indicate the beginning of the credentials, secret indices, and/or a signature. The secret index/indices (e.g., eight 8-bit random indices each of which represents a random number) may represent random numbers which are known to the application delivery controller 120 and the authorization server 126, for example, as mentioned above. The secret number(s) may be exchanged between the application delivery controller 120 and the authorization server 126 using a separate, two-way TLS session during startup of the application delivery controller 120, for example. The signature may be encrypted using various methods, as described above, for example SHA1.

FIG. 10 shows an example of data present in the cookie. For example, FIG. 10 illustrates a table 1000 with example encoded user credentials 1002 and signature 1004 according to some implementations of the techniques described herein. As shown, the credentials may be encoded using base64 encoding, which, when decoded, looks like "user=dr.demours@example.com;role=doctor; domain=abc.example.com;expires=21 Feb. 2016 17:00:00 GMT;indices=|mnt???E;

signature = +?‖m + qök = 1 + IÄ/qrSTae;".

As shown, each field within the token may start with the field name, an "=" sign, and a semicolon which marks the end of a field and separates the fields. For example, the structure of the token may contain a username, role of the user, expiry of the cookie, the indices of the eight random numbers appended by the signature which may be the SHA1 (or other form of encryption) of the fields and, in some instances, the random numbers form the indices as part of the payload.

In some implementations, the application delivery controller 120 verifies that the decoded credentials have not been tampered with. The application delivery controller 120 may verify the integrity of the token by obtaining the secret numbers corresponding to indices present in the cookie and running a SHA on the entire user credentials along with the actual secret random numbers and compare the incoming signature.

Further, the application delivery controller 120 may verify that the role contained in the credentials matches the roles listed in the routing and/or service tables.

Returning to FIG. 8A, if the application delivery controller 120 determines that the token, role, and zone are valid at 812, then the service may check to determine whether the token has timed out at 814. If the token has not timed out, the service may be executed and/or routed at 806. If the application delivery controller 120 determines that the token, role, or zone are invalid then the connection may be closed at 808 or the client device may be redirected to the authorization server 126 to receive a valid cookie and token (not shown).

If, at 810, the application delivery controller 120 determines that no token is present in a cookie, the application delivery controller 120, at 816, may set a cookie with the current domain and URL using the URL. In order to provide for the service request to be carried through the process of receiving a token from the authorization server 126, the application delivery controller may set the cookie with the current domain and current URL (e.g., which may include the service name, API, etc.). The cookie with the current domain and URL allows the application delivery controller to know what service, API, or method the client had initially requested once the token is validated. In some implementations, the cookie may be set as follows: "Set-Cookie: ADCURLPATH=https://path; domain= . . . ; path=/, secure, httponly".

For example, in a case where a token is expected, but the token is missing, the application delivery controller 120 may set a URL cookie and redirect the client device to the authorization server 126 so the client device may receive the token. It should be noted that, in some implementations, the entire process flow is opaque to the client. For example, all redirections are handled internally by the application delivery controller 120. The experience of the user may be such that, once the token is obtained and validated, access to the requested service is allowed without the user having to re-enter/re-request the service request.

At 818, once the cookie is set, the application delivery controller 120 may redirect the client to the authorization module 126 (e.g., the authorization module 126, which may be separate from the application delivery controller 120 or integrated therewith) for the client device of the user of the service to obtain the token. For example, the authorization module 126 may generate a token, set the token as part of the URL and/or URL cookie, and call the application delivery controller 120 with a particular service request (e.g., the service name of the service request may be tokenhandler, as described in further detail below).

In some implementations, the application delivery controller 120 may receive the particular service request (e.g., for the service "tokenhandler"). The particular service request may be for a service known to the application delivery controller 120 and the authorization module 126 and may be defined in the routing or service table.

At 820, the application delivery controller 120 may determine the host. For example, once the application delivery controller 120 receives the particular service request, the application delivery controller determines that the call is from the authorization module 126 and that a token has been presented to the application delivery controller 120 as part of a URL.

At 822, the application delivery controller may get the URL with service 1 from the set URL cookie, and, at 824, the application delivery controller 120 may delete the set URL cookie. In some implementations, once the initial URL (e.g., that the client device had originally requested for the service) is extracted, the application delivery controller 120 may reparse the URL to extract the token from the URL and, since the URL cookie is no longer needed, delete or unset the URL cookie.

At 826, the application delivery controller 120 may check if the current time of a token is valid based on a token grant time and, at 828, the application delivery controller 120 may validate the token (e.g., as described elsewhere herein). For example, once the token is extracted the application delivery controller 120 validates the token and checks if the current time is within an allowed limit of the token grant time. If the time limit has expired, then the application delivery controller 120 may redirect the client device to the authorization module 126 to receive a valid token.

At 830, the application delivery controller 120 may set the token cookie using the URL and, at 832, the application delivery controller 120 may redirect the client device to the application delivery controller 120 for token validation (e.g., to 802 in the workflow 800*a*). For example, if, at 826, the current time falls within the limit, the application delivery controller 120 may set a token cookie and post a self-redirect to itself (the application delivery controller 120) using the path from the URL cookie as an incoming request. For example, the self-redirect basically re-enacts the user's service request to the application delivery controller 120, but now the token has been set in a token cookie, so the application delivery controller 120 can proceed to validate the token and user credentials before allowing access to the requested service (e.g., as discussed in reference to 802-814.

The foregoing description of the implementations has been presented for the purposes of illustration and description. It is not intended to be exhaustive or to limit the present implementations to the precise forms disclosed. Many modifications and variations are possible in light of the above teaching. It is intended that the scope of the present implementations be limited not by this detailed description, but rather by the claims of this application. As will be understood by those familiar with the art, the present implementations may take other specific forms without departing from the spirit or essential characteristics thereof. Likewise, the particular naming and division of the modules, routines, features, attributes, methodologies and other aspects are not mandatory or significant, and the mechanisms that implement one implementation or its features may have different names, divisions and/or formats. Furthermore, as will be apparent, the modules, routines, features, attributes, methodologies and other aspects of the implementations can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the implementations are in no way limited to implementations in any specific programming language, or for any specific operating system or environment. Accordingly, the disclosure is intended to be illustrative, but not limiting, of the scope, which is set forth in the following claims.

What is claimed is:

1. A computer-implemented method comprising:
receiving, by a computing device, a service request from a client device;
determining, by the computing device, routing parameters based on a requested service of the service request;
determining, by the computing device, a security zone of the requested service;
determining, by the computing device, an encryption algorithm corresponding to the security zone;
verifying, by the computing device, a signature assigned to the client device using the encryption algorithm corresponding to the security zone;
authenticating, by the computing device, access by the client device based on the requested service, the security zone of the requested service, the verified signature, and a token; and
routing, by the computing device, the requested service to the client device based on the routing parameters and the authenticated access.

2. The computer-implemented method of claim 1, wherein:
determining routing parameters includes determining, by the computing device, socket handling based on a category of the requested service;
routing the requested service to the client device is further based on a URL of the service request and a role of a user of the client device; and
the authenticated access includes access to one or more of directories and files.

3. The computer-implemented method of claim 1, wherein authenticating access by the client device includes, in response to a determination that the token is required for the requested service and the token is not present on the client device, assigning the token to the client device.

4. The computer-implemented method of claim 1, wherein verifying the signature includes verifying the signature in an order based on the security zone of the requested service.

5. The computer-implemented method of claim 1, wherein the signature is based on the security zone of the requested service and a secret number, the secret number having been exchanged in a separate communication between the client device and an authentication service.

6. The computer-implemented method of claim 1, wherein authenticating access by the client device includes:
determining, by the computing device, whether the requested service is an emergency service; and
authenticating, by the computing device, access to the requested service by the client device based on the determination that the requested service is the emergency service.

7. The computer-implemented method of claim 1, wherein authenticating access by the client device includes determining whether the token is valid based on a grant time for the token.

8. A system comprising:
one or more processors;
a memory storing instructions that, when executed by the one or more processors, causes the system to:
receive a service request from a client device;
determine routing parameters based on a requested service of the service request;
determine a security zone of the requested service;
determine an encryption algorithm corresponding to the security zone;
verify a signature assigned to the client device using the encryption algorithm corresponding to the security zone;
authenticate access by the client device based on the requested service, the security zone of the requested service, the verified signature, and a token; and
route the requested service to the client device based on the routing parameters and the authenticated access.

9. The system of claim 8, wherein:
to determine routing parameters includes determining socket handling based a category of the requested service;
routing the requested service to the client device is further based on a URL of the service request and a role of a user of the client device; and
the authenticated access includes access to one or more of directories and files.

10. The system of claim 8, wherein to authenticate access by the client device includes, in response to a determination that the token is required for the requested service and the token is not present on the client device, assigning the token to the client device.

11. The system of claim 8, wherein to verify the signature includes verifying the signature in an order based on the security zone of the requested service.

12. The system of claim 8, wherein the signature is based on the security zone of the requested service and a secret number, the secret number having been exchanged in a separate communication between the client device and an authentication service.

13. The system of claim 8, wherein to authenticate access by the client device includes:
determining whether the requested service is an emergency service; and
authenticating access to the requested service by the client device based on the determination that the requested service is the emergency service.

14. The system of claim 8, wherein to authenticate access by the client device includes determining whether the token is valid based on a grant time for the token.

15. A computer program product comprising a non-transitory computer useable medium including a computer-readable program, wherein the computer-readable program, when executed on a computer, causes the computer to:
receive a service request from a client device;
determine routing parameters based on a requested service of the service request;
determine a security zone of the requested service;
determine an encryption algorithm corresponding to the security zone;
verify a signature assigned to the client device using the encryption algorithm corresponding to the security zone;
authenticate access by the client device based on the requested service, the security zone of the requested service, the verified signature, and a token; and
route the requested service to the client device based on the routing parameters and the authenticated access.

16. The computer program product of claim 15, wherein:
to determine routing parameters includes determining socket handling based a category of the requested service;
to route the requested service to the client device is further based on a URL of the service request and a role of a user of the client device; and the authenticated access includes access to one or more of directories and files.

17. The computer program product of claim 15, wherein to authenticate access by the client device includes, in response to a determination that the token is required for the requested service and the token is not present on the client device, assigning the token to the client device.

18. The computer program product of claim 15, wherein to verify the signature includes verifying the signature in an order based on the security zone of the requested service.

19. The computer program product of claim 15, wherein the signature is based on the security zone of the requested service and a secret number, the secret number having been exchanged in a separate communication between the client device and an authentication service.

20. The computer program product of claim 15, wherein to authenticate access by the client device includes determining whether the token is valid based on a grant time for the token.

* * * * *